MOVING SCREEN PROJECTION SYSTEM

Filed Feb. 24, 1964 4 Sheets-Sheet 1

INVENTORS
ALVIN M. MARKS
MORTIMER M. MARKS
BY Albert F. Kronman
ATTORNEY

MOVING SCREEN PROJECTION SYSTEM

Filed Feb. 24, 1964 4 Sheets-Sheet 2

INVENTORS
ALVIN M. MARKS
MORTIMER M. MARKS
BY Albert F. Kronman
ATTORNEY

MOVING SCREEN PROJECTION SYSTEM

Filed Feb. 24, 1964 4 Sheets-Sheet 3

INVENTORS
ALVIN M. MARKS
MORTIMER M. MARKS
BY Albert F. Kronman
ATTORNEY

April 26, 1966 A. M. MARKS ETAL 3,248,165

MOVING SCREEN PROJECTION SYSTEM

Filed Feb. 24, 1964 4 Sheets-Sheet 4

INVENTORS
ALVIN M. MARKS
MORTIMER M. MARKS
BY Albert F. Kronman
ATTORNEY

United States Patent Office 3,248,165
Patented Apr. 26, 1966

3,248,165

MOVING SCREEN PROJECTION SYSTEM

Alvin M. Marks and Mortimer M. Marks, both of 153—16 10th Ave., Whitestone, N.Y.

Filed Feb. 24, 1964, Ser. No. 346,730
30 Claims. (Cl. 352—61)

This invention relates to projection apparatus for showing pictures in three dimensions. The invention has specific relation to a plural projection system employing two projectors and a plural screen arrangement having at least two screens spaced from each other. Means are provided for showing the picture projected by a first projection system on a foreground screen while the picture projected by the second projection system is shown on a background screen. Polarizing media are employed to separate the two pictures and eliminate ghost images.

Many attempts have been made in the motion picture industry to create an illusion of depth or a third dimension of the images being viewed. Stereoscopic projection has been employed using polarized light, images of two colors, and wide screen structures. All of these methods include the use of either special spectacles worn by each member of the audience or expensive equipment which is difficult to install in the average theater.

One system of producing apparent three dimensional images has been described in U.S. Patent Number 2,952,182, issued September 13, 1960 to Alvin M. Marks et al. In this system several arrangements of foreground and background projection units are described. These projection units produced pictures on two screens which were separated from each other. Means were provided for eliminating the conflict between images and preventing "ghosts." The present system, described herein, is an improvement over the above mentioned invention and, in addition, provides a control means for varying the distance between the two viewing screens.

One of the objects of this invention is to provide an improved three dimensional projection system which avoids one or more of the disadvantages and limitations of prior art arrangements.

Another object of the present invention is to produce a projection system which creates an apparent depth effect comparable to that created in the stereo systems but one not requiring the use of spectacles by the viewer.

Another object of the present invention is to produce a three dimensional system that can be readily installed without great expense in most theaters now in use.

Another object of the present invention is to produce a projection system that creates a depth effect which can be displayed on curved screens having a width-to-height ratio that more nearly conforms to the natural field of human vision.

Another object of the present invention is to provide a diffuse reflecting system that may also be utilized for the showing of regular flat motion pictures or images without any alterations in the reflecting screens.

It is a further object of the invention to provide a control means which can be used to vary the distance between a foreground screen and a background screen.

Another object of the present invention is to provide an adjustable barrier means in the camera system which can be used to eliminate portions of each of the photographed images so that the foreground picture will blend into the background picture.

It is another object of the present invention to provide a metallic diffusing screen which produces diffuse reflection over a wide angle without any specular reflection and without altering the plane of polarization of the projected light.

Still another object of the present invention is to provide a novel form of foreground screen which is treated to eliminate ghose images resulting from grazing refraction of a portion of the beam intended for the background screen.

The present invention includes a plural projection system combined with at least two viewing screens spaced from each other for showing apparent three dimensional pictures. The multiple screen system includes a foreground reflecting surface having holes for passing some of the projected light, a polarizing film on the screen which passes only light polarized in a first predetermined plane, and a diffusing layer for diffused reflection of the incident light. A background screen is mounted behind the foreground screen and spaced from it for receiving and reflecting light passed through the holes. The background screen includes a polarizing film on the screen surface for passing light polarized in a second plane which is disposed 90 degrees from the first plane and a diffusing layer for diffused reflection of the incident light. The system also includes a first projection means for projecting light polarized in the first plane and a second projection means for projecting light polarized in the second plane for reflection by the background screen.

One feature of the invention includes a filtering means for eliminating portions of each beam of light produced by the two projecting means so as to enable the foreground image to blend with the background image.

Another feature of the present invention includes a control track on the film which controls the distance between the two screens. This track may be arranged to produce frequency signals, area modulated signals, or any other type of signaling indicia which can be used to control a servomotor to bring the two screens together or space them apart a desired distance.

Still another feature of the invention includes a diffuse reflecting screen composed of metallic particles which do not alter the plane of polarization of the incident beam. By corrugating the screen surface the specular reflection is diverted to an angle whereby it cannot be seen by the audience.

For a better understanding of the present invention, together with other and further objects thereof, reference is made to the following description taken in connection with the accompanying drawings.

Figure 6:
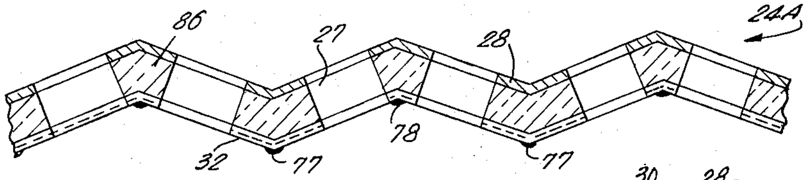
Figure 6A:
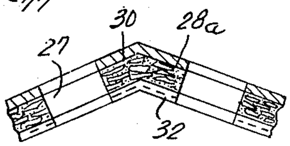

FIGURES 6 and 6*a* are cross sectional views of a portion of two forms of diffusing screen having corrugations for the prevention of specular reflection within a desired viewing angle.

Figure 7:
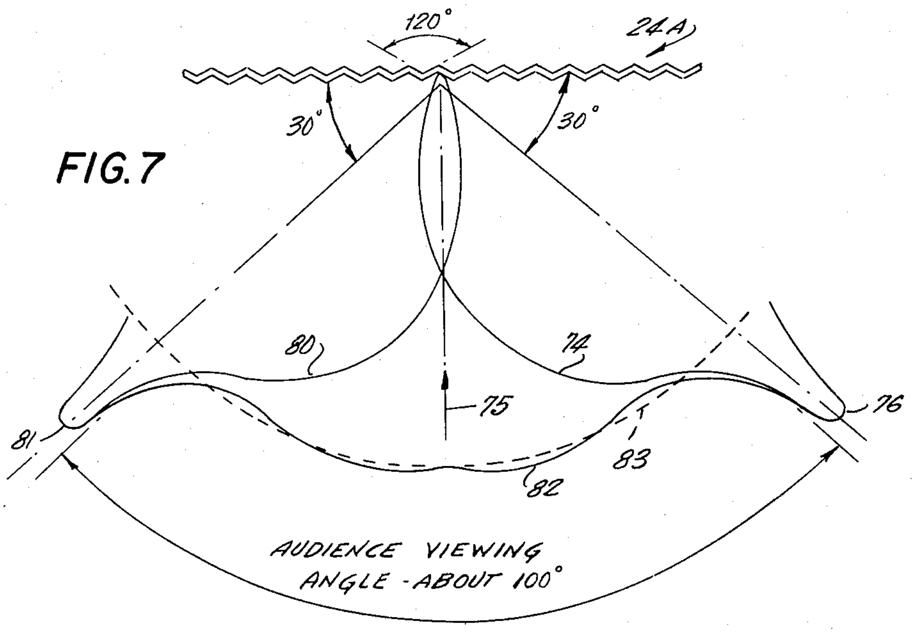

FIGURE 7 is a diagram illustrating how the combined reflections (diffuse and specular) from two adjacent corrugated strips produce equal diffuse intensity over a viewing angle.

Figure 8:
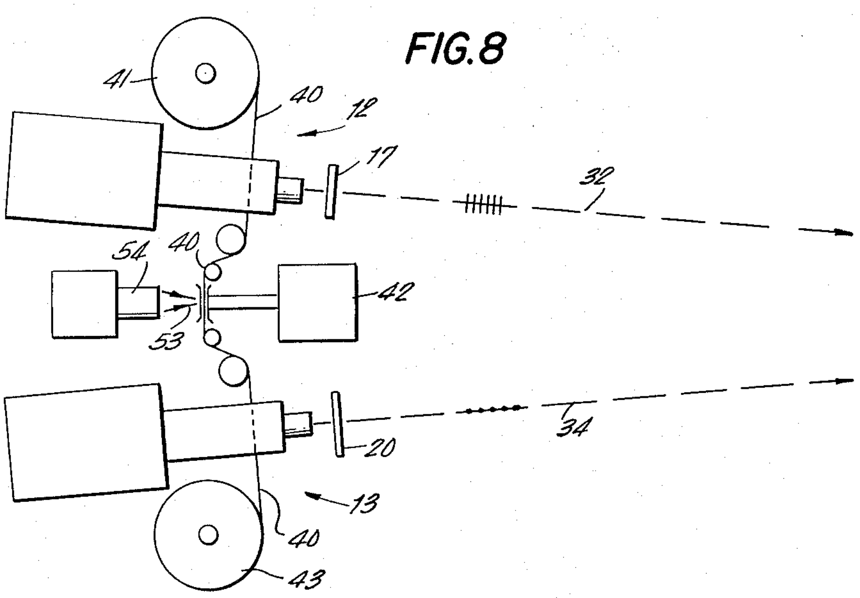

FIGURE 8 is a top view of the two projection systems showing how the film from a storage reel is threaded through both projection systems and also showing a sensing mechanism between the two projectors for deriving a control signal.

Figure 9:
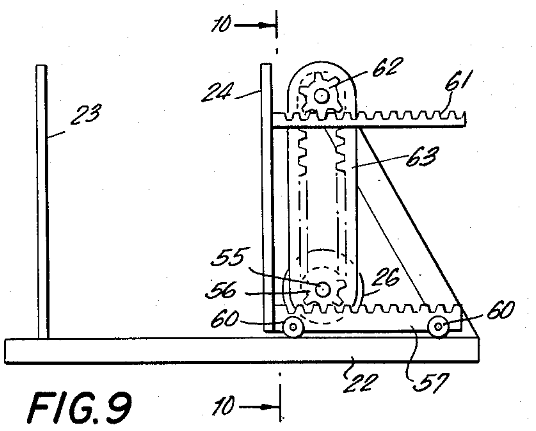

FIGURE 9 is a somewhat diagrammatic side view of one of the screens showing a fixed foreground screen and a movable background screen together with a motor and belts for providing power to move the screen.

Figure 10:
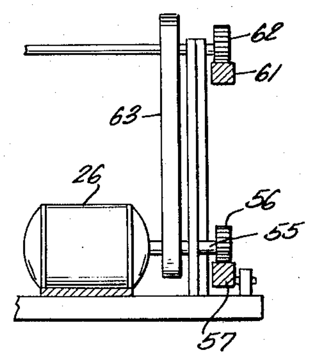

FIGURE 10 is a front elevational view of a portion of the device shown in FIGURE 9 and is taken along line 10—10 of that figure.

Figure 2:
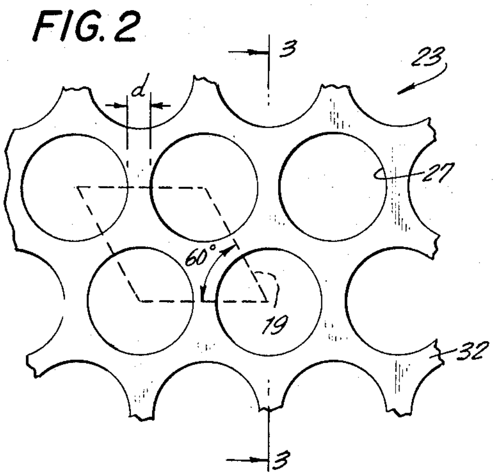
FIGURE 2 is a fragmentary plan view of the foreground screen greatly enlarged.
Figure 11:
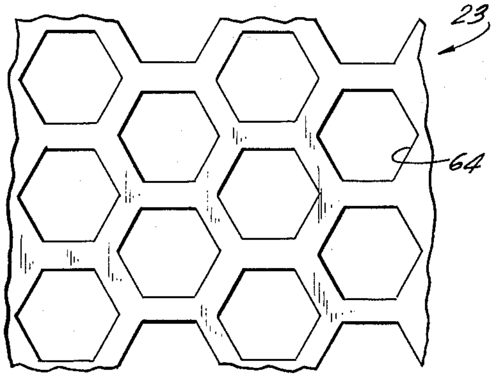

FIGURE 11 is a plan view similar to FIGURE 2 but showing different types of holes in the screen.

Figure 12:
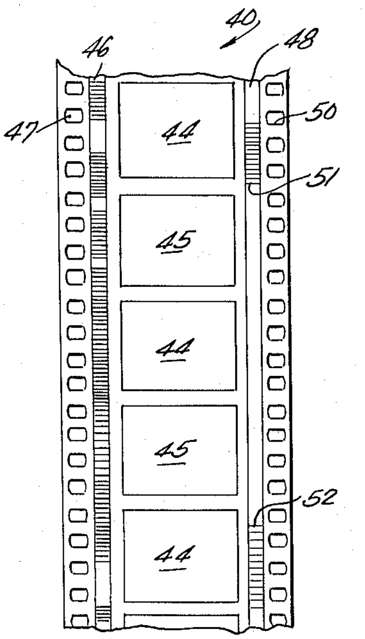

FIGURE 12 is a view of the film which contains the pictures which are to be projected. This film contains a sound track on one side of the picture elements and a control track on the other side.

Figure 13:
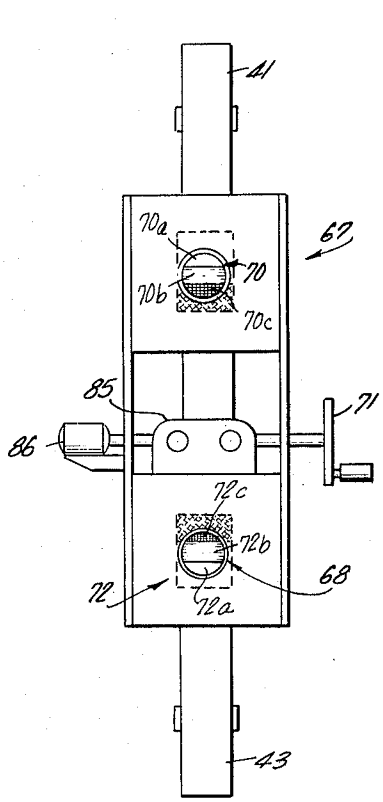

FIGURE 13 is a front view of two cameras which are mounted one on top of the other. This view shows barrier means installed in front of the camera lenses for eliminating part of each picture area.

Figure 14:
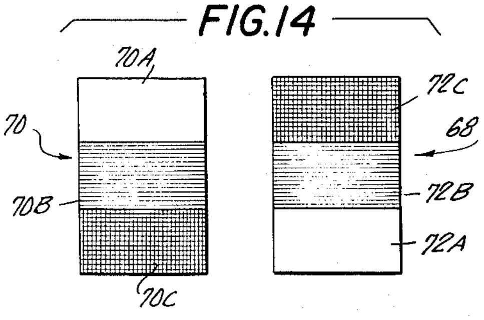

FIGURE 14 shows the details of the barrier means installed within the camera.

Figure 15:
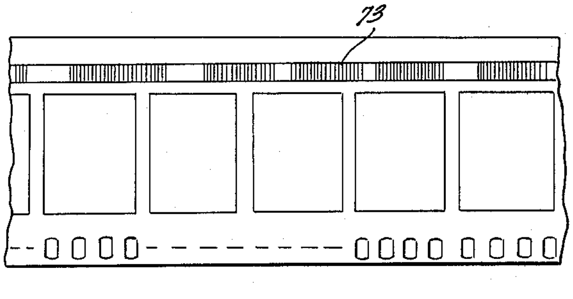

FIGURE 15 is a view of a single track film for use in the present invention.

Figure 1:
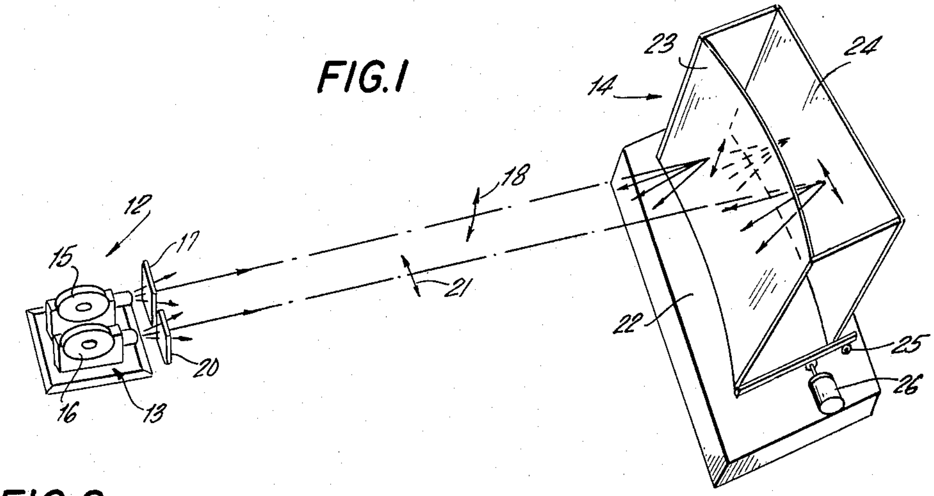
FIGURE 1 is a somewhat diagrammatic perspective view of the entire system which includes two projectors and two viewing screens.

Referring now to FIGURE 1, the invention includes two projectors 12 and 13 for projecting two beams of light toward a multiple screen 14. Each projection unit includes a storage reel 15–16 and the usual lenses which focus the light beams onto the screens. A polarizing filter 17 polarizes the light from projector 12, so that the beam is polarized in a vertical direction as shown by arrow 18. Projector 13 directs its beam of light through a polarizing filter 20 so that the beam which is directed toward the screen arrangement is polarized in a horizontal direction as indicated by arrow 21.

The screen assembly 14 includes a base 22, a foreground screen 23 and a background screen 24. The background screen is movable and is carried generally by a set of rollers 25 and propelled by a servomotor 26. These components will be described hereinafter in greater detail.

Figure 3:
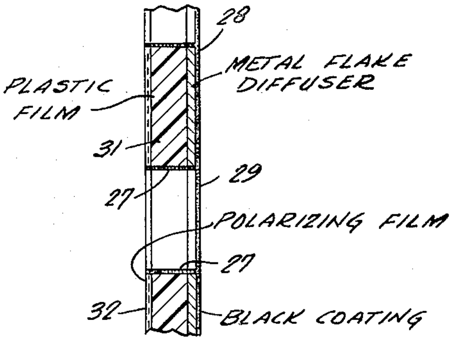
FIGURE 3 is a cross sectional view of the screen shown in FIGURE 2 and is taken along line 3—3 of that figure.
Figure 4:
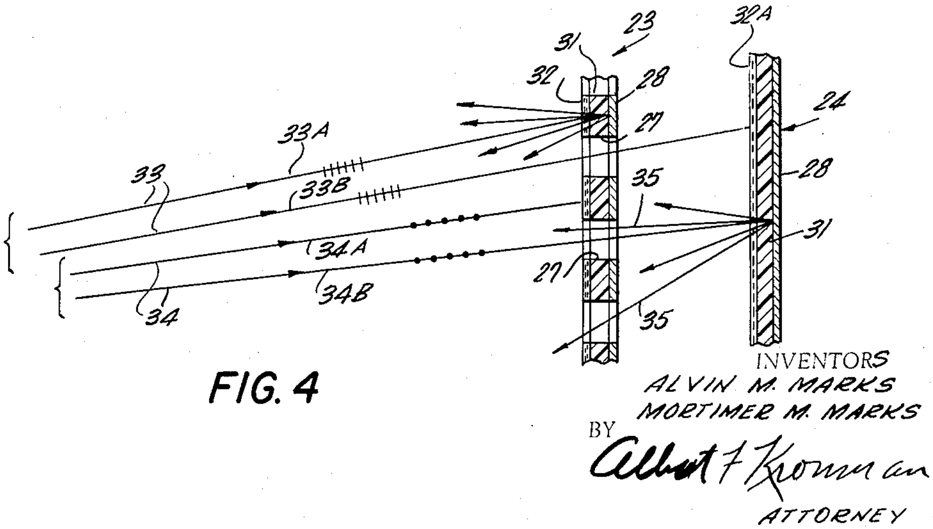
FIGURE 4 is a fragmentary side view of the two screens with parts shown in section.
Figure 5:
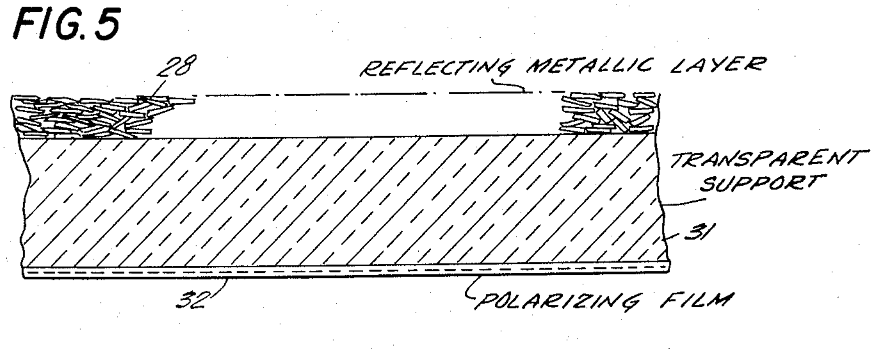
FIGURE 5 is a cross sectional view of a small section of the viewing screen showing the details of the diffuse reflecting layer employing a large number of metallic flakes.

FIGURES 2, 3 and 4 illustrate the manner in which the two screens are formed. The foreground screen 23 is formed with a plurality of holes 27 cut in the screen in a symmetrical array.

In the embodiment of FIGURE 6 the screen is made up of three layers and includes a supporting sheet 86 which is preferably made of some transparent plastic material. On the side facing the projectors, a thin polarizing film 32 is secured for passing rays of light polarized in the direction passed by the polarizing filter having a parallel plane of polarization and for absorbing the rays polarized at right angles thereto. On the back of the sheet 86 a diffuser-reflector film 28 is secured for reflecting the light rays in a diffused manner without changing their plane of polarization. These three components are sufficient to form a good screen with one minor exception. Light rays of opposite polarity, intended for reflection only by the background screen may enter the foreground screen at the sides of holes 27 at grazing incidence. The plane of polarization is altered slightly by this refractive action and then when the ray is reflected from film 28, a portion of it will pass through polarizing film 32 and produce a faint ghost image. These images are annoying even though their intensities may be small. They may be eliminated by covering the sides of the holes with a thin coating of black paint 29 (FIGURE 3). The black coating 29 may also be added to the entire rear surface of the diffusing layer so that any reflections from the background screen will be absorbed.

In the embodiment shown in FIGURE 6*a* the screen is made up of three layers and includes an opaque, black supporting sheet 30 which is preferably made of some light absorbing material, such as black paper or the like. On the side facing the projectors, a thin polarizing film 32 is secured for passing rays of light polarized in the direction passed by the polarizing filters having a parallel plane of polarization and for absorbing the rays polarized at right angles thereto. The polarizing film is secured to the supporting sheet by an adhesive diffuser-reflector film **28*a* for reflecting the light rays in a diffused manner without changing their plane of polarization. The diffuser-reflector film 28*a*** consists of a transparent adhesive having small aluminum flakes dispersed therein.

In the example shown in FIGURE 6*a* the polarizing plane is vertical and only light polarized in this plane will be transmitted to the diffuse-reflecting sheet **28*a***.

In this embodiment of this screen the polarizing film 32 is .0008 inch thick, the diffusing-reflecting sheet 28 is comprised of aluminum flake powder with more than three parts of powder to one part of transparent binder (by weight) and is .002 inch thick, and the black light-absorbing sheet 30 is .005 inch thick.

The background screen 24 is composed of the same films and layers as the foreground screen 23 except that no holes are cut in this screen and the plane of polarization of the polarizing film 32A is at right angles to the polarizing plane of film 32. In the example shown, this plane is horizontal.

For all practical applications the diffusing-reflecting sheet 28 can be relied upon to both reflect and diffuse the incident light rays. The two screens may be vertically corrugated as shown in FIGURES 6, 6*a* and 7 to further reduce specular reflections.

In order to produce two pictures which will blend to show a third dimension, the intensities of the light reflected from both screens must be substantially equal for the same intensity projected from each projector. This may be accomplished by regulating the size of the holes 27 in the foreground sheet so that the area of the remaining reflecting portion of the foreground screen reflects the same amount of light, as that reflected from the background screen 24, after traversing the foreground screen twice. Let I be the intensity of the light reflected from an uncut polarized screen, and if $p$ be the ratio of the cut-out area to the reflecting area of the foreground screen, then the light reflected from the foreground screen has the intensity $I(1-p)$. The light passes through the foreground screen twice on its way to and from the background screen and each time the intensity is reduced by the ratio $p$ resulting in an intensity of $Ip^2$. Equating these quantities gives an equation: $1-p=p^2$ the solution of which is $p=.62$.

If round holes are punched in the screen in a pattern as indicated in FIGURE 2, the distance $d$ between holes for a 0.62 ratio may be determined by equating the area of the parallelogram 19 ($\times 0.62$) with the area of a circle. It should be noted that the four sectors included in the parallelogram are equivalent to a full circle.

If R is the circle radius and $d$ the distance between hole edges then $(2R+d)^2(\cos 30°)(0.62)=\pi R^2$.

The solution of this equation gives $(d/R)=0.42$.

It is well-known that ordinary diffusing screens such as flat white paint, ground glass, or thin opalescent sheets of plastic cannot be used with polarized light since they alter the plane of polarization during diffuse reflection or transmission. Only metallic reflection, such as that obtained from aluminum flakes, can be relied upon to reflect polarized light without changing the angle of polarization. A diffuse-reflecting layer made up of aluminum powder and a binder such as transparent plastic will produce the desired results but unfortunately there is always a certain amount of specular reflection from outer surfaces whenever the angle of reflection equals the angle of incidence. This is illustrated in FIGURE 7 where one of the polar curves 74 shows the reflectance characteristics of a ray of light having a direction indicated by arrow 75 striking a section of diffusing layer 28 set at an angle of 120 degrees. The diffused light intensity is indicated by curve 74 and the specular reflection intensity is illustrated by the pronounced peak 76. This specular reflection produces a glare and must be eliminated for the proper viewing of motion pictures. In some theater installations the screen may be set at a slight angle from the vertical so that the specular reflection rays are diverted either above the heads of the audience or downwardly to an absorbing screen set in front of the audience and below their viewing angle.

FIGURES 6, 6*a* and 7, illustrate one way of eliminating the spectular reflection by diverting these rays to the right and left of the audience. FIGURE 6 shows the screen 24A formed with slight corrugations, these corrugations having an angle of 30 degrees from the surface occupied by the screen elements. The corrugations may be as large as one-quarter of an inch and may be continuous as shown in FIGURES 6 and 7 or may include the perforations 27 as indicated in FIGURES 2, 3, and 4. In order to insure that no specular reflection will be observed by anyone in the audience black lines 77 and 78 are printed on the screen at the apices and troughs formed by the corrugations.

The result produced by this type of screen is indicated in FIGURE 7 where the incident ray of light 75 produces a first light distribution 74–76 from one face and a similar light distribution 80–81 from another face. With these light characteristics and the corrugation angle of 120 degrees, the specular reflective peaks 76 and 81 are separated by an included angle of 120 degrees. With an allowance for eliminating all the specular reflected rays, the useful audience viewing angle is about 100 degrees. The total diffuse reflection from both these reflected beams is indicated by the solid line 82. In FIGURE 7 this line departs only a few percent from the ideal desired distribution denoted by the dotted line 83.

It has been found that the best metallic reflecting diffusing layer is made by mixing aluminum flake powder with a small percentage of binder. If too much binder is used, an electrostatic charge accumulates on the free surface and creates an electric field between the two surfaces of the mixture. This field tends to orient the plates in a position which is generally perpendicular to the supporting surface and very poor reflectivity is obtained. By eliminating most of the liquid binder and using only enough to cement the particles of aluminum together, the reflecting layer 28 not only presents a random array of aluminum flakes to the incident light but also includes a large number of very small air bubbles which help considerably in the diffusing action.

FIGURE 4 illustrates the method in which the two screens cooperate with the two projectors. The two arrows 33 designate rays of two beams of vertically polarized light, one of which strikes a portion of the foreground screen 23 and also rays of two beams 34 polarized in a horizontal direction, one of said rays being directed through a hole 27 in the foreground screen and incident upon the background screen 24. One of the rays 33A from the projector 12 strikes a portion of the foreground screen and penetrates the polarizing film 32, the plastic film 31, and is diffusively reflected by the reflecting sheet 28. The polarizing film 32 is arranged for passing light which is vertically polarized.

A second ray of light 33B from projector 12 passes through one of the holes 27 and is incident upon a polarizing film 32A on the rear screen 24 which is arranged to pass light which is polarized only in the horizontal direction. For this reason light ray 33B is absorbed in film 32A and cannot be seen by the audience. In a like manner, a ray of light 34A, polarized horizontally, strikes polarizing film 32 and is absorbed while another ray 34B from this same projector passes through hole 27, strikes polarizing film 32A, and is transmitted to the diffusing reflecting sheet 28. The reflected light rays 35 are directed toward the audience but only a portion of them pass through holes 27.

It will be obvious from the above description that one portion of the picture will be projected to the background screen 24, where it will be viewed by the audience while another portion of the picture is projected onto the foreground screen 23 where it also will be seen by the audience. In general, the background picture will contain objects that are generally parts of a background such as a distant set of objects or a portion of a room or other enclosure which forms the background of a scene. The foreground screen generally will show the actors or other moving objects which are generally desired to be shown in a position which is closer to the audience. When the background and foreground objects are close together as in a small room, the two screens 23 and 24 should be separated by only a short distance. When the scene is out of doors and the background includes distant hills and distant trees, the two screens 23 and 24 should be separated a maximum distance in order to create an impression of the correct depth.

The amount of separation of the two screens may be controlled by servomotor 26 which receives its control signal from a portion of the film 40 which also includes the picture frames to be projected on both screens. FIGURE 8 shows one method of disposing the two projecting systems 12 and 13 so that the film 40 is unwound from a storage reel 41, first passed through projector 12, then through a control sensing system 42, then through projector 13, and finally wound upon a second storage reel 43. The film used in such an arrangement is shown in FIGURE 12 where alternate picture frames 44 are for showing by the first projector 12. The other alternate frames 45 are for showing by the second projector 13. A sound track 46 may be provided between the sprocket holes 47 and one side of the picture frames 44–45. A control strip 48 may be disposed between the other sprocket holes 50 and the other side of the picture frames. This strip may include control signals which are black and white bands 51 or 52 arranged so that they will generate a sustained frequency signal when the film 40 passes through the central sensing arrangement 42. Such a sensing system may include the usual focused beam of light 53 from a source 54, passing through the control strip 48 and being sensed by the usual photoelectric cell (not shown) within the sensing system 42. These signals, varying in frequency, are sent to a servomotor 26 to control the position of its armature and the position of the second screen. The frequency control arrangement is only one of a number of control arrangements for positioning the second screen. Other control means are well-known in the art and have been described in prior publications in connection with other control problems.

One means of varying the distance between the foreground screen 23 and the background screen 24 includes the servomotor 26 whose shaft 55 is secured to a first gear 56 (see FIGURE 10). This gear meshes with a rack 57 which is secured to the lower portion of background screen 24. The rack 57 may slide on a base 22 or it may be mounted on wheels 60 to reduce the friction. A similar rack 61 is secured to the upper portion of screen 24 and this rack meshes with a second gear 62 similar to gear 56. The two gears are coupled by a flexible belt 63, also run by a gear on the motor shaft 55. Other methods of moving the rear screen to vary the distance between the foreground and background screens may be used.

The screen shown in FIGURE 11 is similar to that shown in FIGURE 2 except that this alternate form contains hexagonal perforations 64 and therefore the material between the cut-out portions has a greater width than the minimum spacing between the circular perforations. This form of screen is more resistant to tearing.

It will be obvious from the consideration of FIGURE 4 that a super-position of images may occur if the background picture includes white portions which are on the same level as dark portions of the foreground picture. A ray of light such as 34B (FIGURE 4) can pass through hole 27, be reflected by the background screen 24 and emerge as rays 35. For this reason it is important that a super-position of background and foreground images be eliminated. Picture composition may be pre-established to accomplish this result with the aid of the structures shown in FIGURE 13 where one camera 67 is mounted above the second camera 68. Storage reel 41 is shown above the top camera and the take-up reel 43 is positioned below the second camera. A first mask 70 is mounted in the optical system of the top projector which carries the film 40 and accepts only the pictures which contain the background images. This mask (see FIGURE 14) contains an upper transparent portion 70A, an intermediate gradient density semi-transparent portion 70B, and a lower opaque portion 70C. This mask cuts off the foreground picture below a certain level.

In a similar manner the lower camera 68 contains a second mask 72 which is the reverse of the first mask 70. This mask contains a lower transparent portion 72A, an intermediate gradient density semi-transparent portion 72B and an upper opaque portion 72C. This mask eliminates the upper portion of the foreground image so that there will be no superposition of the two pictures when the film images are projected.

A range finder 85 may be attached to cameras 67 and 68 and adjusted by a crank 71. Any type range finder may be used but it is assumed that some form of image coincidence is incorporated into the system. The range finder is generally trained on the background objects and when these move up towards the foreground, an operator turns crank 71 to adjust for the change in distance. A movable electric element, such as a variable capacitor 86 is secured to the shaft turned by crank 71 and the output of the element 86 changes the signal frequency to the input inscribed on the film track 51. In this way a control signal which positions the background screen toward or away from the foreground screen, is automatically recorded at the same time the pictures are taken.

It is obvious that the two screens 23 and 24 may be moved together so that they will present a single flat image. This will be done whenever ordinary moving pictures are shown. When three dimensional pictures are shown, the two screens are separated an amount which is under control of the control circuit 42 and then the background portion of the projected picture has a real as well as apparent spacing to show depth. A depth sensation is produced since each eye of the observer sees the foreground picture displaced differently in relationship to the background picture. It is also obvious that this type of projection system can be used equally well with color pictures as well as black and white.

As shown in FIGURE 15, a single track 73 may be employed in lieu of the two separate tracks 46, 48.

When employing a single track, a frequency in excess of 15,000 cycles or lower than 50 cycles is impressed on the sound track 73 and the high or low frequency signal is separated from the sound signal by known appropriate electrical filter networks (not shown) which direct the sound signal into the sound amplifier and the servo signal into the servo amplifier. In this manner, a standard film track may be employed obviating the need for an extra track.

The servo signal may be generated by a variable frequency oscillator operating in a suitable frequency band. This signal may be mixed with the sound signal using an appropriate mixer network so that the sound signal normally fed on to the tape is also accompanied by the servo signal which is simultaneously recorded.

For maximum efficiency the light polarizing material of which the screen is made should have a light transmission of 35% or better and preferably between 35–43%. The polarizers when crossed should have a cut off of better than .05%. The polarizers should be efficient throughout the entire visible spectrum and have a neutral gray appearance to ordinary light.

Having thus fully described the invention, what is claimed as new and desired to be secured by Letters Patent of the United States, is:

1. A system for showing apparent three dimensional pictures comprising; a multiple screen system which includes a foreground reflecting screen perforated with a plurality of holes for the passage of light, a polarizing film on said screen which transmits light polarized in a first predetermined plane, and a diffusing reflecting sheet also on said screen for reflection; a background screen spaced from the foreground screen for receiving and reflecting light passed through the perforations in the foreground screen and including a polarizing film on the screen surface for the passage of light polarized in a second plane disposed ninety degrees from said first plane, and a diffusing reflecting sheet also on said background screen for diffuse reflection of light; a first projection means for projecting light polarized in said first plane for reflection by the foreground screen; and a second projection means for projecting light polarized in said second plane for reflection by the background screen.

2. A system for showing apparent three dimensional pictures comprising; a multiple screen which includes a foreground reflecting screen for diffuse reflection of a picture having components positioned in the foreground, said screen including a polarizing film which transmits light polarized in a first predetermined plane, a diffusing reflecting sheet for diffuse reflection, and an opaque absorbing layer; said screen having a plurality of perforations for the passage of at least fifty percent of the incident light; a background reflecting screen for diffuse reflection of a picture having components positioned in the background; said screen including a polarizing film on the screen surface for the passage of light polarized in a second plane disposed ninety degrees from said first plane, and a diffusing reflecting sheet for diffuse reflection, a first projection means for projecting light polarized in said first plane for reflection by the foreground screen; and a second projection means for projecting light polarized in said second plane for reflection by the background screen.

3. A system for showing apparent three dimensional pictures comprising; a first projector having a source of light, an object plane, a focusing means, and a polarizing filter for polarizing a projected beam in a first predetermined plane; said first projector adapted to receive film containing a plurality of pictures for foreground projection; a second projector having a source of light, an object plane, a focusing means, and a polarizing filter for polarizing a projected beam in a second plane disposed ninety degrees from said first plane; said second projector adapted to receive film containing a plurality of pictures for background projection; a foreground screen including a polarizing film for passing light polarized in said first plane and a diffusing reflecting sheet for diffusing and reflecting the light received, said foreground screen having a plurality of holes for the passage of at least fifty percent of the incident light; and a background screen including a polarizing film for passing light polarized in said second plane and a diffusing reflecting sheet for diffusing and reflecting the light received.

4. A system as claimed in claim 1 wherein said screens are spaced one behind the other with means for varying the distance between them.

5. A system as claimed in claim 4 wherein the means for varying the distance between screens is under the control of a strip on said film.

6. A system as claimed in claim 5 wherein a photosensitive element is provided for determining the light transmittance of said control strip and an amplifier control circuit is provided for applying the said transmittance variations to a servomotor coupled to one of the screens for selectively positioning the foreground screen with respect to the background screen.

7. A system for showing apparent three dimensional pictures comprising; a foreground screen and a background screen spaced therefrom; a first propector having a course of light, an object plane, a focusing means, and a polarizing filter for polarizing a projected beam of light in a first predetermined plane; said first projector adapted to receive film containing transparency pictures for projection on the foreground screen; a second projector having a source of light, an object plane, a focusing means, and a polarizing filter for polarizing a projected beam in a second plane disposed ninety degrees from said first plane; said second projector adapted to receive film containing transparency pictures for projection on the background screen; a foreground diffusing screen for showing the focused images produced by said first projector; said foreground screen including a polarizing film which transmits light polarized in said first plane, a diffusing reflecting sheet for diffuse reflection, and an opaque absorbing layer; said screen having a plurality of perforations for the passage of at least fifty percent of the incident light; a background diffusing screen for diffuse reflection of the focused images produced by said second projector spaced from the foreground screen; said background screen including a polarizing film which transmits light polarized in said second plane, and a diffusing reflecting sheet for diffuse reflection, and means to vary the distance between the screens.

8. A system as claimed in claim 7 wherein said projectors are adjacent to each other and receive a film strip having one set of picture frames for projection by the first projector and a second set of picture frames for projection by the second projector.

9. A system as claimed in claim 8 wherein said film strip contains a series of indicia which controls the distance between the foreground and background screens.

10. A system as claimed in claim 8 wherein said foreground screen perforations are circles and pass substantially 62% of the incident light.

11. A system as claimed in claim 8 wherein said foreground screen perforations are hexagons and pass substantially 62% of the incident light.

12. A system as claimed in claim 9 wherein said indicia produce identifiable frequencies in a control circuit.

13. An article of manufacture for the diffuse reflection of polarized light having a predetermined plane of polarization comprising;

(a) a supporting light absorbing film,
(b) a polarizing film secured to one side of the supporting film for plane polarizing light rays passing through it, and
(c) a diffusing reflecting layer comprising an adhesive and a plurality of light reflective flakes therein between the said supporting film and the polarizing film for diffuse reflection of the light passing through the polarizing film.

14. An article of manufacture for the diffuse reflection of polarized light comprising, a supporting light absorbing film, a polarizing film secured to one side of the supporting film for plane polarizing light rays passing through it and a diffusing reflecting layer between the said supporting film and polarizer for diffuse reflection of the light passing through the polarizing film.

15. An article of manufacture as claimed in claim 14 wherein said perforations are round and are equally spaced from each other.

16. An article of manufacture for the reflective diffuse reflection of polarized light having a predetermined plane of polarization comprising;

(a) a supporting sheet formed with linear corrugations,
(b) a polarizing film secured and conforming to one side of the supporting sheet for plane polarizing the light rays passing through it, and
(c) a diffusing reflecting sheet between the polarizer and the supporting sheet and thereby conforming to the corrugations formed in the sheet.

17. An article of manufacture for the reflective diffuse reflection of polarized light comprising; a supporting sheet, linear corrugations formed on each side of said sheet, said corrugations including strips of plane surface areas each disposed at a desired angle with the general plane of the sheet; said corrugations diverting specular reflective light rays to an angle beyond a viewing range, a polarizing film secured to one side of the supporting sheet, and a diffusing reflecting layer between the polarizer and the supporting sheet.

18. A article of manufacture as claimed in claim 21 wherein the apices and troughs formed by said corrugations are covered by black non-reflecting strips to eliminate specular reflection therefrom.

19. A projection screen for the diffuse reflection of plane polarized light incident upon it comprising; a corrugated supporting sheet, said corrugations including strips of plane surface areas, a first set of said strips disposed at an angle to the incident light for reflecting the light in one direction, a second set of said strips disposed at the same angle to the incident light for reflecting the light in a second direction, a polarizing film secured to one surface of the supporting sheet, and a diffusing reflecting layer between the polarizer and the supporting film.

20. A projection screen as claimed in claim 14 wherein the said diffusing reflecting layer is formed of metallic flake powder and a transparent binder.

21. A projection screen as claimed in claim 14 wherein said polarizer has a transmission of not less than 35% of light and a cut off in the crossed position of .05%.

22. A projection screen as claimed in claim 20 wherein said diffusing reflecting layer is composed of at least three times as much metal powder as binder.

23. A system according to claim 1 in which the diffusing reflecting sheet contains a plurality of metallic flake reflectors.

24. Apparatus for taking pictures of a scene for subsequent three dimensional projection comprising a first camera and a second camera spaced from the first camera, a first variable density mask in front of the first camera for passing only that portion of the scene which occupies the lower portion of the foreground and a second variable density mask in front of the second camera for passing only that portion of the scene which occupies the upper portion of the background.

25. A device according to claim 24 in which at least one of said cameras is provided with a range finder and means to derive a depth signal from the operation of the said range finder.

26. An article of manufacture for the diffuse reflection of polarized light comprising;

(a) a supporting transparent film,
(b) a polarizing film secured to one side of the supporting film for plane polarizing light rays passing through it,
(c) a diffusing reflecting sheet having one side secured to said supporting film for diffuse reflection of the light passing through the polarizing film, and
(d) light absorbing layer secured to the other side of the reflecting sheet.

27. An article of manufacture for the selective diffuse reflection of polarized light comprising, a supporting transparent film, a polarizing film secured to one side of the supporting film for plane polarizing light rays passing through it, a diffusing reflecting sheet also secured to said supporting film for diffuse reflection of the light passing through the polarizing film, and an absorbing layer positioned on one side of the reflecting sheet, said array of films and sheets formed with perforations for passing substantially 62% of the incident light.

28. An article of manufacture for the diffuse reflection of polarized light comprising a supporting light absorbing film, a polarizing film secured to one side of the supporting film for plane polarizing light rays passing through it, a diffusing reflecting layer between the said supporting film and polarizer for diffuse reflection of light passing through the polarizing film said array of films and sheets formed with perforations for passing more than 50% of the incident light.

29. An article of manufacture according to claim 27 wherein the perforations are of a size to pass 62% of the incident light.

30. A system according to claim 24 wherein at least one of the cameras is provided with a range finder.

References Cited by the Examiner

UNITED STATES PATENTS

| | | | |
|---|---|---|---|
| 1,673,793 | 6/1928 | Ames | 95—18 |
| 2,076,482 | 4/1937 | Riszdorfer | 95—18 XR |
| 2,086,556 | 7/1937 | Jacobson | 352—61 XR |
| 2,218,875 | 10/1940 | Parsell | 352—58 XR |
| 2,309,879 | 2/1943 | Willis | 352—58 |
| 2,453,075 | 11/1948 | Land et al. | 95—18 |
| 2,651,233 | 9/1953 | Tondreau et al. | 95—18 |

FOREIGN PATENTS

| | | |
|---|---|---|
| 971,838 | 8/1950 | France. |

JULIA E. COINER, *Primary Examiner.*